United States Patent
Wozniak et al.

(10) Patent No.: US 10,318,220 B2
(45) Date of Patent: Jun. 11, 2019

(54) COST-TARGET-DEPENDENT PRINTING USING RECIPIENT DEMOGRAPHICS

(71) Applicant: Eastman Kodak Company, Rochester, NY (US)

(72) Inventors: Terry Anthony Wozniak, Springfield, OH (US); Steven T. DiLullo, Miamisburg, OH (US); Jennifer S. Pennington, Dayton, OH (US); Joseph P. Mangan, Oakwood, OH (US); William Mansfield, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 15/672,622

(22) Filed: Aug. 9, 2017

(65) Prior Publication Data
US 2019/0050182 A1 Feb. 14, 2019

(51) Int. Cl.
*G06F 3/12* (2006.01)
*G06Q 30/02* (2012.01)

(52) U.S. Cl.
CPC .......... *G06F 3/1253* (2013.01); *G06F 3/1208* (2013.01); *G06F 3/1229* (2013.01); *G06F 3/1268* (2013.01); *G06F 3/1285* (2013.01); *G06Q 30/0206* (2013.01)

(58) Field of Classification Search
CPC .... G06F 3/1253; G06F 3/1208; G06F 3/1229; G06F 3/1268; G06F 3/1285; G06Q 30/0206
USPC ....................................................... 358/1.15
See application file for complete search history.

(56) References Cited

U.S. PATENT DOCUMENTS

| | | | |
|---|---|---|---|
| 2007/0153311 A1* | 7/2007 | Carling | G03G 21/02 358/1.13 |
| 2008/0037064 A1 | 2/2008 | Goetz et al. | |
| 2008/0239366 A1* | 10/2008 | Cyman | G03G 15/50 358/1.15 |
| 2010/0005038 A1 | 1/2010 | Nagarajan et al. | |
| 2010/0250334 A1* | 9/2010 | Farrell | G06Q 30/02 705/14.48 |
| 2010/0312598 A1 | 12/2010 | Huster et al. | |
| 2012/0154850 A1* | 6/2012 | Zhao | G06Q 30/0283 358/1.15 |
| 2014/0160501 A1* | 6/2014 | Beretta | H04N 1/6033 358/1.9 |
| 2015/0371118 A1 | 12/2015 | Lin | |

FOREIGN PATENT DOCUMENTS

JP 2012-218282 11/2012

* cited by examiner

*Primary Examiner* — Neil R McLean
(74) *Attorney, Agent, or Firm* — Kevin E. Spaulding

(57) ABSTRACT

A method for printing a print job including a plurality of document using a printing system includes receiving demographic information for document recipients associated with each of the documents. Printing parameters for each document are automatically determined such that an estimated total cost for printing the print job is not more than a predefined target cost. The printing parameters used for each document are determined responsive to analyzing the demographic information for the associated document recipient and estimated costs for printing the document using different printing parameters. Each document is printed using the respective determined printing parameters.

18 Claims, 5 Drawing Sheets

COST-TARGET-DEPENDENT PRINTING USING RECIPIENT DEMOGRAPHICS

CROSS REFERENCE TO RELATED APPLICATIONS

Reference is made to commonly assigned, co-pending U.S. patent application Ser. No. 15/672,647, entitled: "Adjusting printing parameters to meet a target cost," by T. Wozniak, which is incorporated herein by reference.

FIELD OF THE INVENTION

This invention pertains to the field of digital printing and more particularly to adjusting the printing of a print job to meet a specified cost target.

BACKGROUND OF THE INVENTION

In the commercial printing industry, the cost for printing a print job depends at least in part on the print media used, the volume of ink printed, the time required to print the job, and the energy costs associated with operating the printing system including the energy costs associated with drying the ink on the print media. When a print shop receives a print job, the print shop and the customer need to agree to a price for completion of the print job. For large or complex print jobs, it can be difficult to estimate an appropriate price for the print job without, for example, a careful analysis of the ink consumption for each document in the print job or an analysis of the time required to print the job, which includes estimating the time required to RIP the print job or estimating the print speed constraints associated with providing sufficient time to dry the ink before the printed side of the print media contacts a roller.

While there are estimating tools available for providing estimates for each of these costs, the estimating tools require processing each of the documents within the print job to determine ink consumption rates and the other costs. For large or complex print jobs, especially for variable data print jobs, the processing of each document can become a laborious task which adds costs to the print job. The price estimate must often be given based on preliminary, and not final data. The final data could alter the ink used in the final print job based on image content, and may not be available until just prior to printing.

There remains a need therefore for an improved means for determining and controlling the cost for a print job that ensure a profit for the print shop while providing a print quality and price that are acceptable to the customer.

SUMMARY OF THE INVENTION

The present invention represents a method for printing documents using a printing system, including:

receiving a print job including a plurality of documents, each of the documents having an associated document recipient;

receiving demographic information for the document recipients;

receiving a target cost for printing the print job;

using a data processing system to automatically determine printing parameters for each document such that an estimated total cost for printing the print job is not more than the target cost for printing the print job to within a predefined tolerance, wherein the printing parameters used for each document are determined responsive to analyzing the demographic information for the associated document recipient and estimated costs for printing the document using different printing parameters, and wherein the determined printing parameters for at least two of the documents differ from each other; and using the printing system to print the print job, wherein each document is printed using the respective determined printing parameters.

This invention has the advantage that printing parameters for documents in a print job can be adjusted can be adjusted on a document-by-document basis in order to meet a target cost.

It has the additional advantage that the total cost of the print job can be controlled while maintaining the print quality for documents intended for higher-priority recipients at a higher level than for documents intended for lower-quality recipients.

Figure 1:
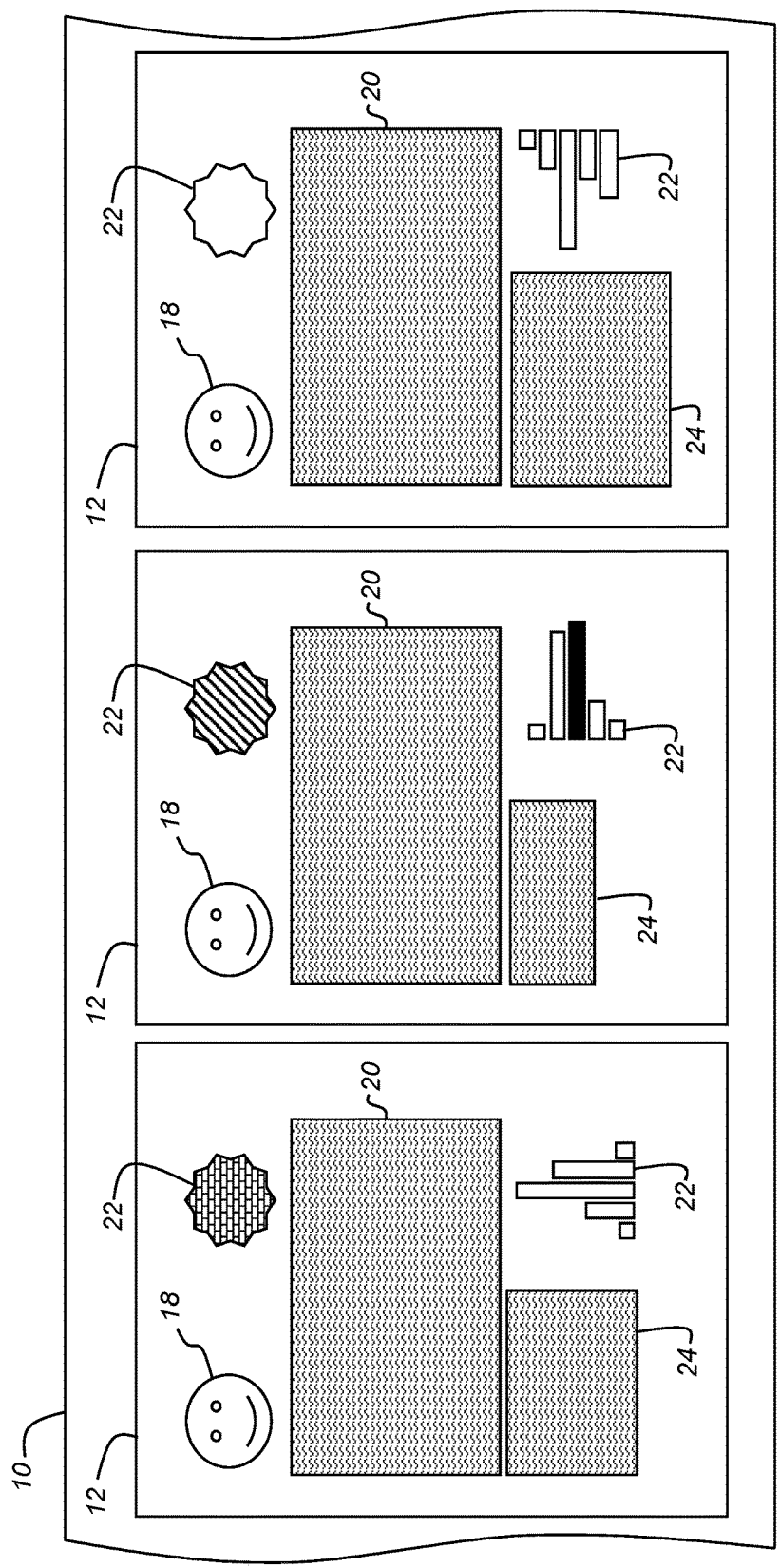
FIG. 1 illustrates an exemplary print job including a plurality of document pages for printing on a printing system in accordance with embodiments of the present invention.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

High-speed variable printing systems are used in the commercial printing industry for a wide variety of printing applications such as printing short-run books or catalogs and advertisements, transactional printed products such as bills and investment reports, packaging materials, and décor such as wallpaper or the printed patterns for laminate flooring or countertops. Typically, high-speed variable printing systems are operated by print shops that print a variety of print jobs for a number of different clients. It is common for the print jobs printed by high-speed variable printing systems to be made up of a sequence of printed documents. Each document can include one or more document pages. The pages are sometimes referred to as images. The print jobs are typically received in the form of a page description language (also referred to as an image description language), such as PostScript, PDF, AFP, IJPDS, and IPDS, which provide image descriptions of each page (i.e., each image).

Each document page can be made up of several components, where the components can include continuous tone image components and vector format image components. Continuous tone image components are commonly used for photographic images, and are specified by an array of pixels having pixel values representing the intensity of each pixel, typically for a plurality of color planes. Common continuous tone image formats include JPEG, TIFF, GIF, BMP, and PNG. Vector format image components are specified by a geometrical description that can be scaled in size. It is commonly used for text and computer generated image components. Common vector format image formats include CGM, SVG, and PPT.

The sequence of document pages in a print job can include a mix of fixed data, which are common from one page to the next or from one group of pages (book or financial statement) to the next group of pages and variable data with changes from image to image. FIG. 1 illustrates a portion of an exemplary print job 10 including a series of individual document pages 12, such as financial statements. The pages 12 include fixed graphics elements 18, such as logos, and fixed text elements 20 that are common to a plurality of pages 12, together with variable graphics elements 22 and variable text elements 24 that are specific to a particular page 12. In some cases, the formation of the pages 12 in a print job 10 can involve data merger operations in which variable data (e.g., mailing addresses or financial transaction data) is extracted from a database or spreadsheet and the extracted variable data is inserted into a form or template that has fixed text elements 20 or fixed graphics elements 18. The template can also include variable graphic elements 22, such as a graph in which the content of the graphic element depends on variable data extracted from the database of spreadsheet or a figure selected from a collection of figures based on variable data extracted from the database or spreadsheet.

Figure 2:
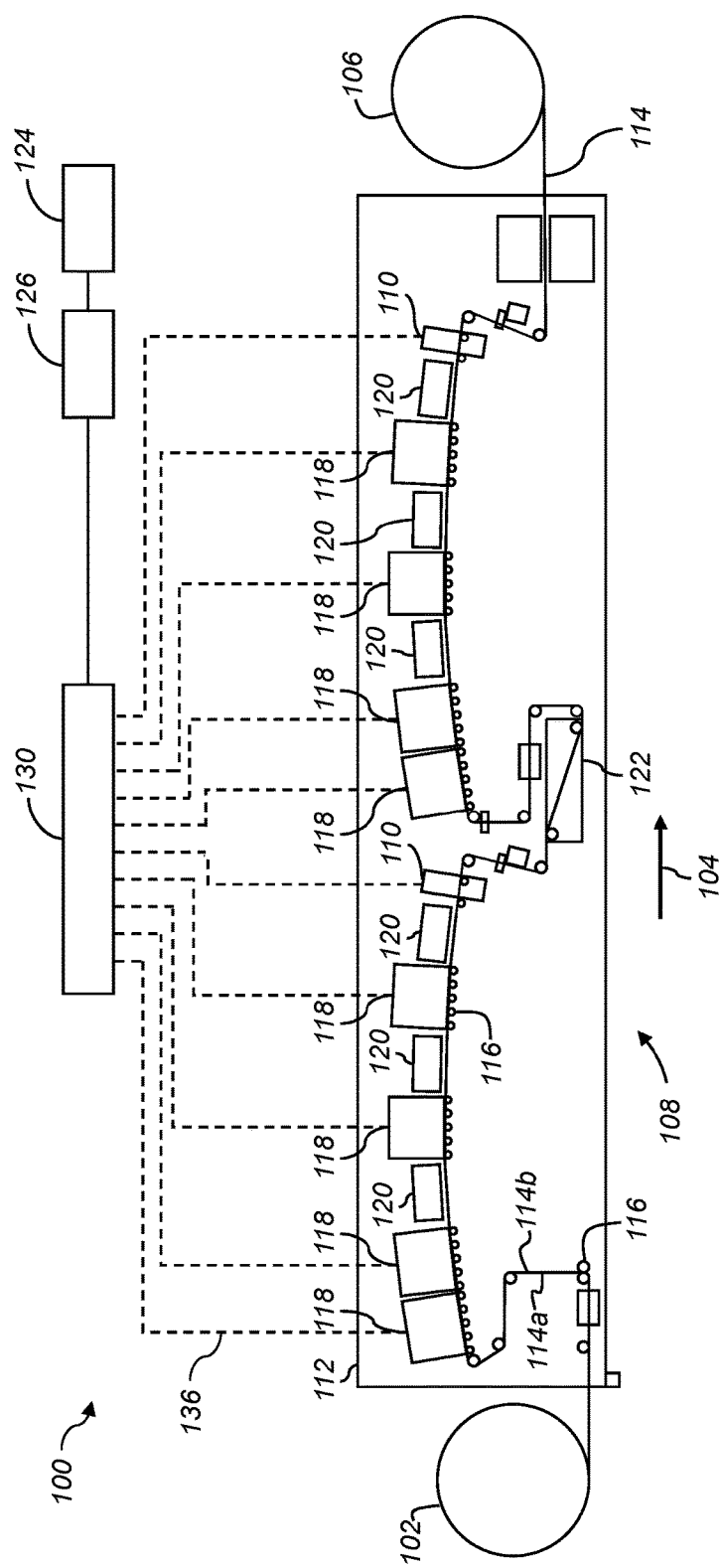
FIG. 2 illustrates an exemplary continuous inkjet printing system.

Referring to FIG. 2, a high-speed variable printing system 100 has a print engine 112 (also referred to herein as a printer) that prints on a receiver 114. The term "receiver" refers to media that accepts a printed image and is singular or plural, as indicated by context. In some embodiments, the receiver 114 can be multiple cut-sheets. In the particular embodiments discussed herein, the receiver 114 is in the form of a web of media that is an elongate, continuous piece. The use of a web typically allows the print engine 112 to attain higher speeds in transport, than other forms of receiver 114, such as cut-sheets. The receiver 114 is typically paper, but can also be any of a large number of other types of print media. For example, the receiver 114 can be thin or thick paper stock (coated or uncoated) or transparency stock. The receiver 114 has a first surface 114a and an opposed second surface 114b, one or both of which may be printed.

The web of receiver 114 in FIG. 2 is moved in an in-track direction 104 from a supply 102 to a take-up 106 by a web transport system 108. Between the supply 102 and take-up 106, the web is threaded around a number of rollers 116 and past a sequence of printheads 118. In various embodiments, the printheads 118 can be continuous ink jet printheads, drop on demand ink jet printheads, electrophotographic toning stations (with or without transfer rollers or the like), or other equivalent units of a variable printing technology. For simplicity, in the discussion here, the printheads are generally discussed in terms of an embodiment in which the printheads 118 are arranged in a sequence, and wherein each printhead 118 extends across the full width of the receiver 114. It will be understood that like considerations apply to other embodiments. For example, instead of using a full width printhead 118, a group of printheads 118 can be arranged in an interleaved pattern to print a wider receiver 114.

The different printheads 118 each print image data for a printable image plane. A unit of image data that corresponds to an image plane is referred to herein as a "segment". The image planes are printed in registry with each other and, in combination, provide a printed page. The term "printed page" as used herein, thus, corresponds to the image printed on a single side of a piece of media. A piece of receiver 114 can include printed pages on one or both surfaces. Each printed page can define an image area corresponding to the full dimensions as the sheet or can define a smaller area within those dimensions. A print job 10 (FIG. 1) can include a plurality of documents, where a document can include one or more document pages 12 (i.e., images). In some embodiments, each document is intended to be a unit for delivery to a single recipient. Examples of multi-sheet documents include books, financial statements, and multiple sheet advertising material. Each page 12 can include a plurality of image planes representing a part of a document that is conveniently printed separately by a corresponding printhead 118. For example, each image plane can use a different color of ink. With ink jet printheads, different image planes can sometimes be used to divide an image into different patterns of relatively spaced apart deposited drops. The resulting combined image is unchanged, but the different patterns improve drying, during the printing process.

Two sets of four printheads 118 are shown in FIG. 2. The invention is not limited as to a particular number of printheads 118 or sets of printheads 118. In the illustrated embodiment, after passing one set of printheads 118, the partially printed image (not shown) on the first surface 114a of the receiver 214 is dried by one or more dryers 120 (e.g., by contact with a heated drum). The web is then flipped over by a turn station 122 before passing a second set of printheads 118 that print on the second side 114b which is then dried by one or more additional dryers 120. The printing system 100 can also include one or more quality control sensors 110.

In an exemplary configuration, a print job 10 including the image descriptions for multiple documents each including one or more document pages 12 is supplied from various image data sources by one or more input units 124. As will be described later, a data processing system 126 performs at least some of the operations necessary to convert the page descriptions to an image data format appropriate for the printheads 118. A main controller 130 is used to control the operation of the print engine 112, including sending image data to the printheads 118 over data paths 136 to print the image data provided by the data processing system 126. In some configurations the main controller 130 can also be connected to the quality control sensors 110 and can process images or data received from the quality control sensors 110.

In some configurations, the functions of a system manager and user interface (not separately illustrated) can also be provided by the data processing system 126. The system manager provides a communication hub, together with system level administration and control features for other system components. The user interface provides setup and status information for the operation of the printing system 100. Via this user interface, the user can input data pertaining to the physical characteristics of the printer, such as the relationships of the printheads, desired colors the system is capable of printing, and other information. Upon a power-up or a reset, the main controller 130 initializes the printing system 100 to a ready state.

As high-speed variable printing systems are typically operated by print shops to print various print jobs 10 for external clients, the clients and print shops must negotiate a price for the printing services. The production costs for printing service is highly dependent on characteristics of the print job 10, on the configuration of the printing and finishing systems, and on printing parameters that are used to print the print job 10. For example, the cost will depend on the type of paper and amount of ink used, and on the post printing finishing operations that are utilized such as the application of various overcoats or various folding and cutting operations. The print shop must therefore review a print job to provide a reasonable estimate for the print job cost. While some of the production costs can be readily determined, the production costs associated with amount of ink consumed is more difficult to estimate. To get an accurate estimate of the amount of ink that will be consumed can involve pre-RIPing every document page 12 within the print job 10 to determine a quantity of each color ink required. As this process is very computational intensive, it may not be practical for print jobs 10 that include tens of thousands or even millions of document pages 12. As a result, the production cost estimates must can be way off the mark. If an estimate of the production costs is too low, this can put the print shop at significant financial risk. If the estimated costs are too high, the client may cancel the print job or may elect to order the print job using a lower quality option such as using a cheaper paper or like.

Figure 3:
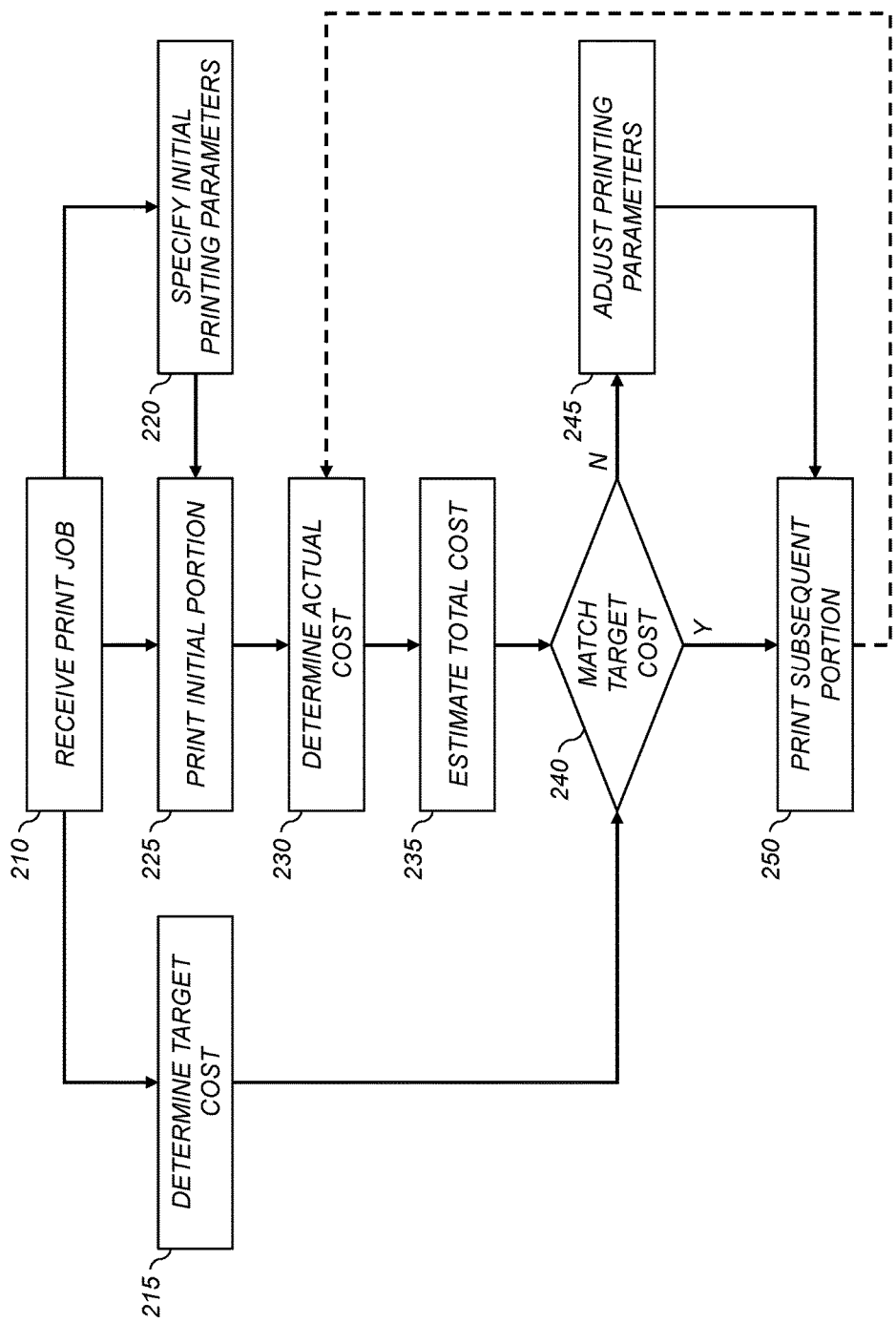
FIG. 3 is a flow chart showing a method for adjusting printing parameters to achieve a target cost in accordance with an exemplary embodiment.

Embodiments of the present invention provide methods for reducing the financial risks associated with negotiating a price for a print job. The methods are performed, at least in part, by a processing system such as the data processing system 126 of FIG. 2. A flow chart for one exemplary embodiment is shown in FIG. 3. The method begins with the print shop receiving a print job 10 (FIG. 1) in receive print job step 210. In an exemplary configuration, the print job 10 includes a plurality of documents, each document including one or more document pages 12. In some embodiments, each document is associated with an associated document recipient which is characterized by demographic information. For example, each document can be a direct mail advertisement or a financial statement to be mailed to an intended recipient.

Upon examination of the print job 10, production costs are estimated and a target cost ($C_t$) is negotiated or determined in determine target cost step 215. The target cost can include a variety of cost components including some or all of receiver medium cost, ink cost, finishing operation cost, labor cost, electrical power cost, and a cost associated with the time it takes for the printing system to print the document.

Initial printing parameters are specified in specify initial printing parameters step 220. The initial printing parameters can include parameters specifying a variety of printing system attributes or settings. For example, the printing parameters can specify the paper type, the color mode (e.g., color vs. grayscale), the color transforms to be applied (which can control attributes such as upper ink coverage limits and the under-color removal settings), the print speed, and various other printing and finishing parameters. In some embodiments, the initial printing parameters can be associated with a target image quality level specified by the customer.

In print initial portion step 225, an initial portion of the print job 10 (FIG. 1) is printed on the printing system 100 (FIG. 2). In some embodiments, the initial portion can correspond to a predefined number of document pages 12, or a predefined number of documents. In other embodiments, the initial portion can be selected in any appropriate manner. For example, the initial portion of the print job 10 can correspond to a specified fraction of the document pages 12 in the print job 10.

As this initial portion of the print job 10 is being printed, the actual cost for printing that portion of the print job 10 is determined in determine actual cost step 230. In an exemplary embodiment, to determine the actual cost, the main controller 130 (FIG. 2) monitors the quantity of each ink color being printed. It also monitors the amount of print receiver 130 used and the print time, along with various other printing system parameters that contribute to the actual cost of printing the print job. The resulting actual cost value can be scaled by the number of pages in the initial portion to determine an average cost per document page:

$$P_{a,0} = \frac{C_{a,0}}{N_0} \quad (1)$$

Where $C_{a,0}$ is the actual cost for the initial portion of the print job, $N_0$ is the number of document pages in the initial portion, and $P_{a,0}$ is the actual average page cost for the initial portion of the print job.

Based on the determined actual costs for printing the initial portion of the print job, the total cost for completing the print job is estimated in estimate total cost step 235. The estimated cost for printing the print job can include estimates for some or all the costs associated with ink consumption, receiver medium usage, energy consumption, finishing operations, labor, and amortization of the equipment. The estimated cost can also include a cost associated with the time it takes for the printing system to print the print job, as the time printing the current print job is time that is no longer available to print another revenue generating print job. In an exemplary configuration, the estimated cost for printing the print job is determined using the assumption that the average cost per document page for the remainder of the document pages will be the same as that determined for the initial portion. In this case, the estimated cost ($C_e$) can be calculated using the following relationship:

$$C_e = \frac{N_T}{N_0} C_{a,0} = N_T P_{a,0} \qquad (2)$$

Where $N_T$ is the number of document pages in the print job.

In match target cost test 240, the estimated cost ($C_e$) for completing the print job 10 is compared with the target cost. In some embodiments, if the estimated total cost differs from the target cost by more than a predefined tolerance $\Delta C$ (i.e., if $|C_e - C_t| > \Delta C$), then an adjust printing parameters step 245 is used to determine a set of adjusted printing parameters for use in printing a subsequent portion of the print job 10 using a print subsequent portion step 250. In other embodiments, the adjust printing parameters step 245 is only executed if the estimated total cost exceeds the target cost by more than a predefined tolerance (i.e., if $C_e > C_t + \Delta C$). If the match target cost test 240 determines that the estimated total cost matches the target cost (or doesn't exceed the target cost) to within the predefine tolerance, execution proceeds to a print subsequent portion step 250 with no change in printing parameters.

The adjusted printing parameters determined by the adjust printing parameters step 245 are selected to bring the total print job cost in line with the determined target cost. For cases where the estimated total cost exceeds the target cost, the adjust printing parameters step 245 preferably selects adjusted printing parameters that produce the least amount of degradation in print quality while still meeting the target cost. For example, if the estimated total cost exceeds the target cost, a color transform parameter can be modified to select a different color transform which reduces the amount of ink usage at the tradeoff of a smaller color gamut, or a print speed parameter can be modified to increase the print speed at the tradeoff of a lower image quality level, or a color mode parameter can be modified to print the subsequent portion in a grayscale print mode rather than a color print mode. It will be obvious to one skilled in the art that there are a wide variety of printing parameters that can similarly be adjusted to reduce (or increase) the printing cost, each one having a corresponding impact on the print quality and other printing attributes. In some embodiments, if the estimated total cost is less than the target cost, the adjust printing parameters step 245 can also determine corresponding adjusted printing parameters. In this case, the adjusted printing parameters are selected to enhance the print quality, increasing the printing costs to bring the estimated total print cost for the print job 10 in line with the target cost.

In an exemplary configuration, the adjust printing parameters step 245 first determines the average cost per document page that would be needed for the print job to hit the target cost. In an exemplary configuration, this determined using the following relationship:

$$P_{a,r} = \frac{(C_t - C_{a,0})}{(N_T - N_0)} \qquad (3)$$

where $P_{a,r}$ is the average page cost needed for the remaining document pages to hit the target cost. In some embodiments, the average page cost for the remaining document pages is compared to the average page cost for the initial portion to determine a fractional cost F that is required to hit the target cost:

$$F = \frac{P_{a,r}}{P_{a,0}} \qquad (4)$$

For example, if F=0.9, then the page cost for the remaining pages should be reduced by 10% relative to the page cost of the initial portion. The adjust printing parameters step 245 can then determine a set of printing parameters that will provide the desired cost savings, for example by selecting a color transform that will use a lower amount of ink in order to reduce the page cost accordingly.

In print subsequent portion step 250, a subsequent portion of the print job 10 is printed using the current printing parameters (either the adjusted printing parameters if an adjustment was found to be necessary or the initial printing parameters of no adjustment was required). In some cases, the subsequent portion of the print job 10 can corresponding to the remainder of the print job. In other cases, the print job 10 can be divided into a plurality of portions (including the initial portion) and the subsequent portion can correspond to the next portion of the print job 10. In this case, after printing the subsequent portion, the process can iterate by again performing the determine actual cost step 230 and the estimate total cost step 235 to determine a new estimated total cost. In an exemplary embodiment, the new estimated total cost is determined by assuming that the average page cost for the remaining pages will be the same as the actual average page cost for the most recently printed portion. The new estimated total cost can then be compared to the target cost and the printing parameters can be adjusted again if necessary. This process can be repeated after printing each portion of the print job 10 until the entire print job 10 has been printed.

In some embodiments, one of the printing parameters adjusted by the adjust printing parameters step 245 is a total ink usage parameter. This parameter can be used to select between a set of pre-defined color transforms (e.g., pre-defined ICC color transforms) or can be a parameter specifying an upper inking limit to be used for a color transform. The resulting color transform specified in accordance with the total ink usage parameter is preferably applied in the RIPing process which converts the image data for a document page 12 from a page descriptor format to a bitmap. The total ink usage parameter serves to control the amount of ink used to print the document pages 12.

Figure 4:
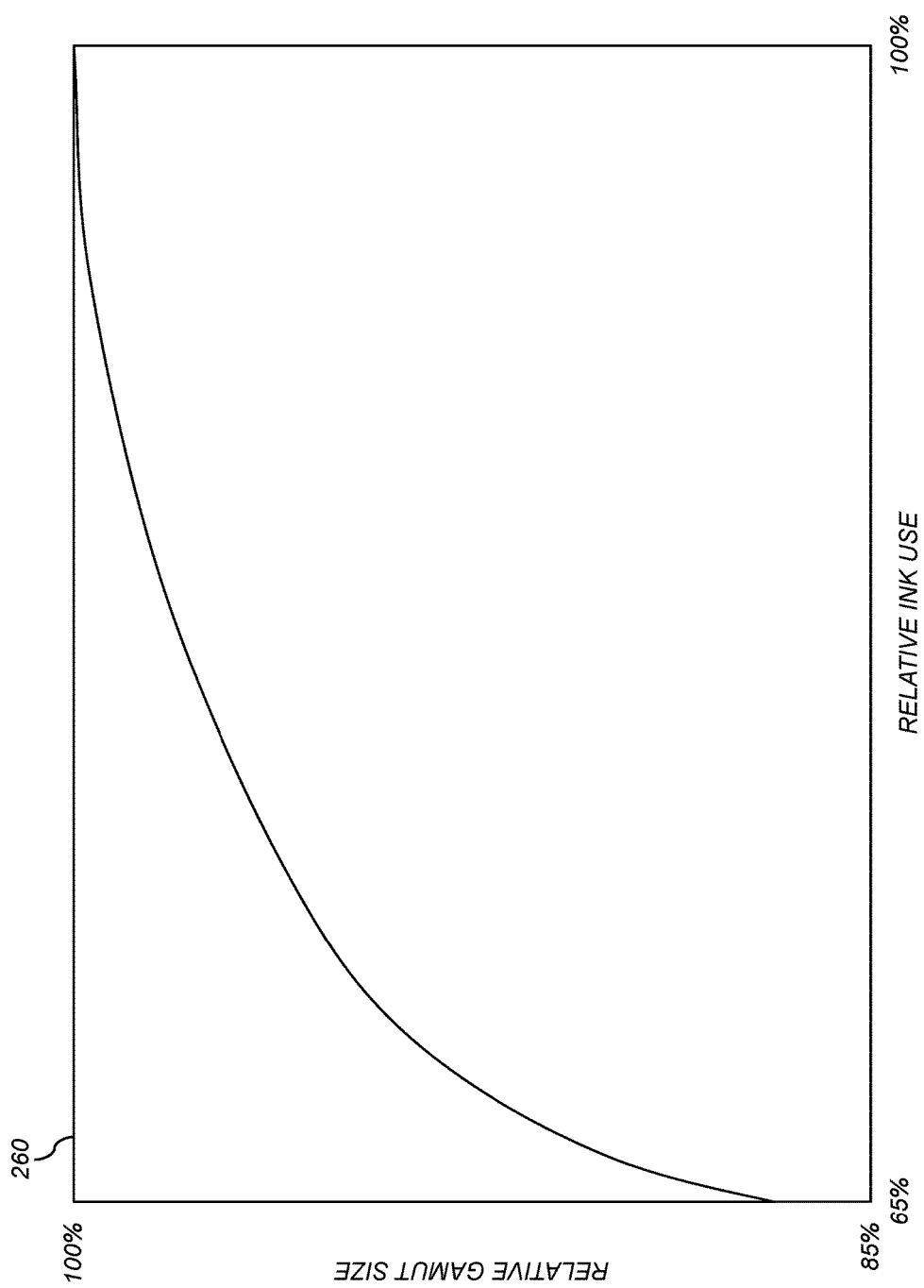
FIG. 4 is a graph showing an exemplary relationship between relative ink usage and color gamut.

FIG. 4 shows a graph 260 illustrating that the size of the color gamut varies in a non-linear manner with the amount of ink used. As a result, changes in the total ink usage parameter which produce small changes in the ink usage produce only small changes in the size of the printed image color gamut, and likewise on the optical density or color saturation of the printed image. As ink costs can exceed 40% of the total cost of printing the print job 10, even fairly small changes in the total ink usage can have a very significant effect on the total cost of printing the print job 10.

The adjustable printing parameters can also include a spatial resolution parameter. For example, the print resolution in the in-track direction can be shifted between 900 pixels per inch and 600 pixels per inch, or other possible in-track resolutions. If a change in print resolution isn't accompanied by a corresponding change in the drop size, the change in print resolution will change the amount of overlap of the printed dots and therefore on the total amount of ink used for printing.

The adjustable printing parameters can also include a color mode parameter that controls selecting to print an image in grayscale (i.e., as a "black-and-white" image), or in color. Typically, switching from a color mode to grayscale mode can reduce ink consumption by typically about 50%, which will significantly reduce the printing cost. The color mode parameters can also select whether to print the documents in a high-fidelity color mode in which additional colors of ink are used to print the document pages in addition to the normal subtractive primary colors of cyan, magenta, yellow, and black. The additional colors can include blue, green, and orange, fluorescent inks, and metallic inks. The color mode parameters can also include selecting to apply pattern dependent overcoats to highlight selected regions of the documents. In some embodiments, the color mode parameter can specify whether all or only a portion of the images are printed in color rather than black and white. For example, a color mode parameter may specify for some documents that the figures on the first page of a document are in full color while other the figures on other pages are in grayscale (i.e., black-and-white); for other documents, the color mode parameter may specify that all figures are in full color. The color mode parameter can also specify that certain important page elements (e.g., a company logo having a specified color) are reproduced in high-fidelity color while other page elements are reproduced using a lower level of color accuracy, or are converted to grayscale in order to reduce ink consumption.

The adjustable printing parameters can also a print speed parameter. A faster print speed will generally result in less time required to complete the printing of the print job, and therefore will provide the opportunity to print more print jobs. This will correspondingly reduce the "time cost" of the print job. The time cost can sometimes be referred to as an "opportunity cost" because longer printing times reduce the opportunity to make profit by using the printing system to print other print jobs. However, in some printing systems, a higher speed printing can increase the visibility of some print artifacts so that the print speed must be traded off against the quality reduction. In web-fed printing systems, print speed can typically only be changed gradually with multiple documents being printed during a transition in print speed, so the print speed parameter can't be changed on a document-by-document basis.

The adjustable printing parameters can also include a receiver media type parameter. In many high-speed printing applications, the cost of the receiver medium can account for more than 40% of the print job cost. Therefore, selection of the receiver medium can have a major role in affecting the printing cost. In sheet-fed printing systems, there can be multiple supply trays each with a different receiver medium type allowing the medium type to be changed on a document-by-document basis. In web-fed printing systems, it is typically impractical to change receiver medium type except at the transition from one roll of receiver medium to another.

The adjustable printing parameters can include finishing operation parameters. These finishing operation parameters can control finishing operations such as the application of overcoats to the printed documents, as well as various slicing, slitting, and perforating options.

In some applications, it may be desirable to limit the frequency at which some or all adjustments to the printing parameters can be applied. For example, when printing books, it may be desirable to limit changes in the print resolution parameter or the total ink usage parameter to occur between books so that there isn't a perceptible change in image intensity between the different pages of a given book. In some applications, as the print shop and its clients negotiate the target cost, they may set limits on which printing parameters can be adjusted or by how much those parameters can be adjusted. For example, they may determine that the type of receiver medium can't be changed but the total ink coverage parameter can be change to allow the total ink coverage to vary between 100% coverage and 80% coverage.

When printing certain variable data print jobs, the ink consumption of each document can depend on the content selected for that document that is based on information associated with the recipient of the document. The sequence order for printing the document in the print job can produce long-term modulations in the ink consumption rate. If the printing parameters are adjusted too frequently based on the estimated print job cost, the printing parameter may be inappropriately adjusted in response to the long-term modulations in ink consumption. Consider for example a print job in which the documents for recipients in rural areas include a large picture of a tractor in a field, while the documents for recipients in an urban setting include a small figure of a push lawnmower. If the print job is printed in a presorted mail delivery order, then a large block of consecutive documents might be printed with the high ink coverage tractor picture followed by a subsequent block of documents having the lower ink coverage lawnmower picture. Overall the total print cost for this print job might equal the pre-defined target cost if no adjustments are made. However, if the print job costs are estimated part way through the printing of the block of document having the tractor picture, the estimated total cost based on the high ink usage of the tractor documents would overestimate the cost of printing the entire print job. This could lead to unnecessarily adjusting the printing parameters to reduce the print cost. If the next portion of the print job, which includes the lower coverage lawnmower, is printed using the adjusted print parameters, then the next estimate for the print job costs could underestimate the total print job cost and leading to another adjustment to the printing parameters. To avoid such unnecessary adjustments to the printing parameters, the parameter adjustment frequency should be less than the frequency of the long-term modulation in ink consumption, and preferably less than half the frequency of the long-term modulation in ink consumption.

In some embodiments dealing with variable data print jobs of documents for multiple recipients, the print shop and its client can allow the printing parameters to be adjusted to meet the target price based on demographic information of the recipients of documents within the print job. The demographic information for the document recipients can include attributes such as age, gender, household income, purchasing history, payment history, account balance, or residence location. The purchasing history can include the information such as the total dollar value of the purchases that the recipient has made from the client in a defined time interval, the frequency of purchases, types of products that the recipient has purchased, etc. The payment history can include whether the recipient has an unpaid balance, or whether the recipient has a history of late payments. The account balances can include the amount outstanding in a credit card account or the amount of money held within one or more financial accounts. The residence location can be characterized by zip code or street address, etc. One or more printing parameters may be adjusted on a document-by-document basis to ensure that the print job meets its cost target based on such demographic information.

For example, consider the case where a print job is a set of documents which are direct mail advertisements advertising one or more products or services that are to be mailed to a set of recipients. In this case, it can be desirable to adjust the printing parameters for the documents responsive to a response likelihood for the associated document recipients. For example, the printing parameters for documents intended for certain recipients who have a purchasing history with a high dollar value of recent purchases may adjusted such that they are printed in high fidelity color, while the printing parameters for documents intended for other recipients may be printed in regular process color, or grayscale plus a single spot color, or just in grayscale. In this example as the printing of the print job progresses and the estimated costs for completion of the print job continues to get updated, the purchase history break points can be adjusted that determine which recipient gets which color printing mode. It has been common for variable data printing application to change the content of documents based of the recipient's demographics. This adjustment of printing parameters to meet a target cost is distinct from changing the content of the document based on the demographics of the recipient. This present invention doesn't change the content of the documents, but rather changes printing parameters (such as a color mode parameter or a total ink coverage parameter) that affect the printing cost of the document.

Figure 5:
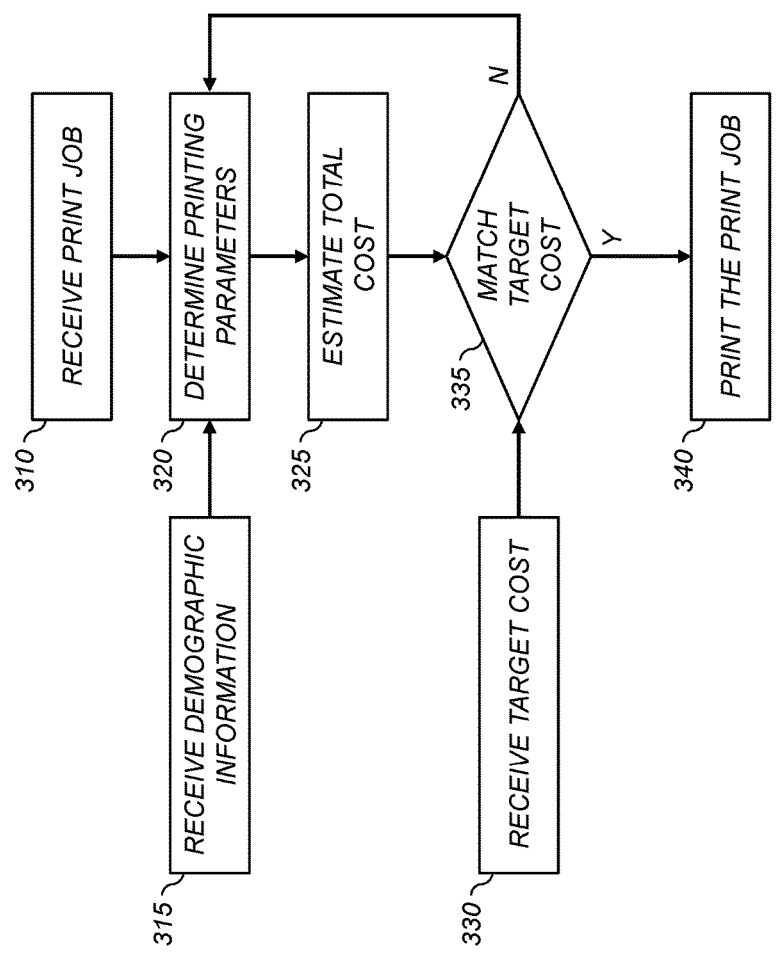
FIG. 5 is a flow chart showing a method for adjusting printing parameters for different documents based on recipient demographics to achieve a target cost in accordance with another exemplary embodiment.

A flow chart illustrating an exemplary embodiment in which printing parameters are adjusted based on demographic information associated with the document recipients is illustrated in FIG. 5. The method begins with the print shop receiving a print job 10 (FIG. 1) in receive print job step 310. The print job 10 includes a plurality of documents, each of the documents having an associated document recipient. Each of the documents includes one or more document pages 12 (i.e., images). Examples of types of documents include books, financial statements (e.g., bank statements or billing statements), and direct-mail advertising material.

Demographic information associated with the intended recipients of the documents in the print job 10 is received by the processing system in receive demographic information step 315. As discussed earlier, the demographic information for the document recipients can include attributes such as age, gender, household income, purchasing history, payment history, account balance, or residence location. The demographic information may be received from a variety of different sources. In some cases, it can be received directly from the customer. In other cases, it can be derived from the data obtained from external sources like Lexis Nexis, or it can be augmented by external data.

From the received print job and demographic information, an initial set of printing parameters for each document is determined in determine printing parameters step 320. In some embodiments, the initial set of printing parameters can be the same for each document to provide some default level of quality and performance. In other embodiments, the initial set of printing parameters can take into account the demographic information such that the printing parameters for documents intended for certain recipients are set to produce higher quality results than for others. In either case, the initial printing parameters will generally be adjusted based on the demographic information before the print job is printed in order to control the printing cost.

An estimated total cost for printing the print job 10 is estimated in estimate total cost step 325. In an exemplary embodiment, the determination of the estimated total cost based on historic data associated with printing print jobs with similar documents with various printing parameter settings. For example, actual costs for similar documents can be determined for different total ink limits and color modes. In some embodiments, an initial portion of the print job can be printed and actual costs can be determined as discussed earlier with respect to the method of FIG. 3. In this case, the different documents in the initial portion can be printed with different printing parameters to provide average page costs as a function of the printing parameters. The method of FIG. 5 can then be applied to the remainder of the print job where the estimated total cost is determined based on the actual costs determined for the initial portion.

A target cost ($C_t$) for the print job 10 is received in receive target cost step 330. The target cost is normally negotiated by the print shop and the client who is requesting that the print job be printed. In match target cost test 335, the estimated total cost ($C_e$) for printing the print job 10 is compared with the target cost. If the estimated total cost matches the target cost to within a predefined tolerance $\Delta C$ (i.e., if $|C_e-C_t|\leq\Delta C$), the printing of the print job 10 can proceed in print the print job step 340.

If the estimated cost and the target cost don't match (i.e., if $|C_e-C_t|>\Delta C$), the determine printing parameters step 320 is performed again to determine a new set of printing parameters wherein the printing parameters for at least one of the documents are adjusted based on the demographic information for the associated document recipients. (In some embodiments, adjusted printing parameters are only determined if the estimated total cost exceeds the target cost by more than a predefined tolerance (i.e., if $C_e>C_t+\Delta C$). If the estimated total cost exceeds the target cost, the printing parameters for at least one document are changed to reduce the total cost (and also the associated print quality), the change in the printing parameters being based on demographic information for the recipients of the documents. In some embodiments, if the estimated total cost is less than the target cost, the printing parameters for at least one document are changed to increase the total cost (and the associated print quality). A new estimated total cost is determined using the estimate total cost step 325 and then compared with the target cost using the match target cost test 335. This process is iterated according to an optimization process until the estimated cost and the target cost match to within the predefined tolerance. The print job 10 is then printed using the print the print job step 340. In accordance with this method, at least one of the printing parameters used to print the document for at least one recipient will generally be different than those used to print the documents for at least some of the other recipients.

In some embodiments, the optimization process can be repeated as the print job 10 is being printed, with new total cost estimates for the print job 10 being made based on the actual cost for the printed portion of the print job as in the method of FIG. 3. The new estimated total cost can be compared to the target cost, and printing parameters for the remaining documents associated with at least one recipient can be adjusted to bring the total print job cost in line with the target cost.

The selection of the printing parameters in the determine printing parameters step 320 can be carried out by using any appropriate optimization algorithm known in the art. In an exemplary embodiment, the optimization algorithm is a multi-objective optimization algorithm. One objective is to minimize the difference between the actual cost for the print job 10 and the specified target cost. A second objective is to maximize the overall print quality of the documents in the print job 10, particularly for the high-priority recipients (as determined from the associated demographic information). In some embodiments, the print quality can be measured by attributes such as the gamut volume, the optical density limit, or color saturation limit. These two objectives typically conflict and lead to tradeoffs. Such multi-objective optimization problems frequently have multiple optimal solutions. Mathematicians have developed a number of different algorithms to select a preferred solution out of the set of possible solutions. In some optimization algorithms, the print cost and print quality metrics are each assigned a weighting to produce a single metric that includes both optimization metrics, this enables the multi-objective optimization problem to be converted to a single objective optimization problem that can be more readily solved. In some embodiments, one of the objects can be to minimize the estimated total cost.

One simple optimization algorithm involves determining a cost/benefit or cost/print quality plot for each of the adjustment parameter. Typically, the adjustment parameters are limited to discrete levels so the cost/print quality plots are not smooth curves but rather involve discrete steps, with each of the adjustment parameters having different step sizes and different ranges. These cost/print quality plots can be combined to produce an overall cost/print quality ladder that can be used to guide the optimization process.

In embodiments of the invention in which printing parameters are adjusted based on demographic information on the recipients associated with the documents in the print job 10, the optimization process becomes more complicated as the metric for determining the overall print quality of the print job must include different weighting for the documents associated with recipient different demographic priority characteristics. In an exemplary embodiment, the print quality metric is designed such that adjusting a printing parameter which degrades the print quality of a document for a lower priority recipient has less of an effect of the total print job print quality metric than does making same printing parameter adjustment to a document for a higher priority recipient. Differences in the print quality weightings for the different demographic priority levels will vary the amount by which the print quality of documents associated with lower priority recipients is degraded before making an adjustment to the print quality of higher priority recipients.

In another exemplary embodiment, rather than defining a total print job quality metric, the optimization process can use a sequential process based on priority levels assigned to the recipients. In one such configuration, the recipients are categorized into a plurality of priority levels based on their demographic characteristics such that recipients having a higher response likelihood for a product being advertised in a direct mail advertisement are given a higher priority. For example, recipients who fall within a target customer range (e.g., based on age, gender and geographical location) for the product, and whose purchasing history indicates that they have previously purchased similar products or services can be classified as high-priority recipients. Recipients that fall within the target customer range, but who have no purchasing history for similar products can be classified as medium-priority recipients. All other recipients can be classified as low-priority recipients. In this case, the determine printing parameters step 320 can first adjust the printing parameters to lower the quality of the documents for the low-priority recipients. For example, the maximum ink coverage can be gradually reduced, and if that is not sufficient to bring the cost in line with the target cost, then the color mode can be changed to grayscale. If the estimated total cost is still too high after the image quality of the documents for the low-priority recipients is reduced to some minimum acceptable level, then the printing parameters of the documents for the medium-priority recipients can be adjusted. Finally, if the estimated total cost is still too high after the image quality of the documents for the low- and medium-priority recipients is reduced to some minimum acceptable level, then the printing parameters of the documents for the high-priority recipients can be adjusted until the estimated total cost matches the target cost.

In some cases, an advertising document can include advertisements for a plurality of different products or services in different portions of the document. In some embodiments, the printing parameters for each document portion can be independently adjusted for each recipient. For example, if the purchasing history for a particular recipient indicates that he has a high response likelihood for the product advertised in a first document portion (e.g., if the advertised product is similar to products that the recipient has previously purchased), but a low response likelihood for the product advertised in a second document portion, then the quality level for the second document portion can be reduced to a lower level than that of the first document portion.

The invention has been described in detail with particular reference to certain preferred embodiments thereof, but it will be understood that variations and modifications can be effected within the spirit and scope of the invention.

PARTS LIST

10 print job
12 page
18 fixed graphics element
20 fixed text element
22 variable graphics element
24 variable text element
100 printing system
102 supply
104 in-track direction
106 take-up
108 web transport system
110 quality control sensors
112 print engine
114 receiver
114a first surface
114b second surface
116 roller
118 printhead
120 dryer
122 turn station
124 input unit
126 data processing system
130 main controller
136 data paths
210 receive print job step
215 determine target cost step
220 specify initial printing parameters step
225 print initial portion step
230 determine actual cost step
235 estimate total cost step
240 match target cost test
245 adjust printing parameters step
250 print subsequent portion step
260 graph
310 receive print job step
315 receive demographic information step
320 determine printing parameters step
325 estimate total cost step 330 receive target cost step
335 match target cost test
340 print the print job step

The invention claimed is:

1. A method for printing documents using a printing system, the printing system having attributes and settings specified by a set of printing parameters, wherein an image quality level and cost of documents printed by the printing system are affected by the printing parameters, comprising:
receiving a print job including a plurality of documents, each of the documents having an associated document recipient;
receiving demographic information for the document recipients,
receiving a target cost for printing the print job;
using a data processing system to automatically determine an initial set of printing parameters for each document such that an estimated total cost for printing the print job is not more than the target cost for printing the print job to within a predefined tolerance, wherein the initial set of printing parameters used for each document are determined responsive to analyzing the demographic information for the associated document recipient and estimated costs for printing the document using different printing parameters, and wherein the determined initial set of printing parameters for at least two of the documents differ from each other; and
using the printing system to print a portion of the print job, wherein each document in the portion of the print job is printed using the respective determined initial set of printing parameters;
determining an actual cost after printing the portion of the print job;
determining an updated estimated total cost for printing the print job including the actual cost for printing the portion of the print job and an estimated cost for printing a remainder of the print job; and
determining adjusted set of printing parameters to be used for printing a subsequent portion of the print job if the updated estimated total cost exceeds the target cost by more than a predefined tolerance such that a new estimated total cost for printing the remainder of the print job with the adjusted set of printing parameters is not more than the target cost for the print job.

2. The method of claim 1, wherein the initial set of printing parameters for each document are determined such that the estimated total cost for printing the print job is equal to the target cost for printing the print job to within the predefined tolerance.

3. The method of claim 1, wherein the printing parameters include a total ink usage parameter, a print speed parameter, a spatial resolution parameter, a receiver media type parameter, or a color mode parameter.

4. The method of claim 1, wherein the demographic information for the document recipients include age, gender, household income, purchasing history, payment history, account balance, or residence location.

5. The method of claim 4, wherein the documents are direct mail advertisements advertising one or more products or services, and wherein the set of printing parameters for each document are determined responsive to a response likelihood for the associated document recipient, the response likelihood being determined by analyzing the demographic information for the associated document recipient.

6. The method of claim 5, wherein printing parameters that provide higher quality printed documents are used for documents associated with document recipients having a higher response likelihood.

7. The method of claim 5, wherein printing parameters that provide higher quality printed documents are used for documents associated with document recipients that have previously purchased products or services similar to those advertised in the direct mail advertisement.

8. The method of claim 4, wherein the documents are direct mail advertisements including a plurality of document portions advertising different products or services, and wherein the set of printing parameters for each document portion are determined responsive to the purchasing history for the associated document recipient.

9. The method of claim 8, wherein printing parameters that provide higher quality printed documents are used for document portions advertising products that are similar to products that the associated document recipient has previously purchased.

10. The method of claim 1, wherein the estimated costs for printing the document includes some or all of an ink cost, a receiver medium cost, a finishing operation cost, an electrical power cost, a labor cost, and an overhead cost.

11. The method of claim 1, wherein the estimated cost for printing the document includes an opportunity cost associated with a time that it takes for the printing system to print the print job.

12. The method of claim 1, wherein the data processing system determines the set of printing parameters for each document using a sequential process that includes incrementally adjusting the set of printing parameters to reduce an image quality for documents associated with lower-priority recipients until the estimated total cost is not more than the target cost to within the predefined tolerance.

13. The method of claim 1, wherein the data processing system determines the set of printing parameters for each document using a multi-objective optimization process.

14. The method of claim 13, wherein one objective of the multi-objective optimization process is to minimize the difference between the estimated total cost and the target cost.

15. The method of claim 13, wherein one objective of the multi-objective optimization process is to minimize the estimated total cost.

16. The method of claim 13, wherein one objective of the multi-objective optimization process is to maximize an overall print quality metric, wherein the overall print quality metric weights the print quality of documents associated with high-priority recipients more highly than the print quality of documents associated with lower-priority recipients.

17. The method of claim 1, wherein the demographic information is derived from an external source.

18. The method of claim 1, wherein the printing system is a continuous inkjet printing system or an electrophotographic printing system.

* * * * *